(12) United States Patent
Shahabi et al.

(10) Patent No.: US 10,540,710 B2
(45) Date of Patent: *Jan. 21, 2020

(54) ELECTRONIC COMPONENT SOURCING USER INTERFACE

(71) Applicant: Sourceability North America LLC, Irvine, CA (US)

(72) Inventors: Yashar Shahabi, Dana Point, CA (US); Jens Gamperl, Cape Coral, FL (US)

(73) Assignee: SOURCEABILITY NORTH AMERICA LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,653

(22) Filed: Jul. 9, 2019

(65) Prior Publication Data
US 2019/0333135 A1 Oct. 31, 2019

Related U.S. Application Data

(63) Continuation of application No. 16/134,804, filed on Sep. 18, 2018, now Pat. No. 10,395,306.

(60) Provisional application No. 62/662,677, filed on Apr. 25, 2018.

(51) Int. Cl.
*G06Q 30/00* (2012.01)
*G06Q 30/06* (2012.01)
*G06Q 10/08* (2012.01)

(52) U.S. Cl.
CPC ......... *G06Q 30/0643* (2013.01); *G06Q 10/08* (2013.01); *G06Q 30/0629* (2013.01); *G06Q 30/0635* (2013.01)

(58) Field of Classification Search
CPC .................... G06Q 30/0601–0643
See application file for complete search history.

(56) References Cited

U.S. PATENT DOCUMENTS

| 9,830,635 | B1 | 11/2017 | Levy |
| 2002/0042756 | A1 | 4/2002 | Kumar |
| 2003/0225679 | A1* | 12/2003 | Tenorio ................. G06Q 30/06 705/37 |
| 2009/0171899 | A1 | 7/2009 | Chittoor |

(Continued)

OTHER PUBLICATIONS

20 Comparison Infographic Templates and Data Visualization Tips by Sara McGuire (https://venngage.com/blog/author/sara/), Mar. 28, 2018 (Year: 2018).

*Primary Examiner* — William J Allen
(74) *Attorney, Agent, or Firm* — Klen, O'Neill & Singh, LLP

(57) ABSTRACT

A method for generating a graphical user interface for electronic component sourcing includes displaying a price axis, displaying a time axis perpendicular to the price axis, and plotting a plurality of data points with respect to the price axis and the time axis, each of the data points corresponding to an offer to sell the electronic component and defining an ordered pair having a first value, plotted along the price axis, representative of a unit price and a second value, plotted along the time axis, representative of a lead time. The method may further include displaying a purchase order panel, adjacent to the price and time axes, by which a user may initiate a purchase of the electronic component according to a selected offer and populating the purchase order panel with the unit price according to the selected offer in response to a user interaction with a corresponding data point.

21 Claims, 5 Drawing Sheets

(56) References Cited

U.S. PATENT DOCUMENTS

| | | |
|---|---|---|
| 2010/0023340 A1 | 1/2010 | Chowdhary |
| 2012/0005045 A1 | 1/2012 | Baker |
| 2012/0316982 A1 | 12/2012 | Futahashi |
| 2014/0098104 A1 | 4/2014 | Kirknel |
| 2014/0297476 A1* | 10/2014 | Wang ................. G06Q 30/0625 |
| | | 705/26.62 |
| 2016/0048900 A1 | 2/2016 | Shuman |
| 2016/0189262 A1* | 6/2016 | Raab ................. G06Q 30/0613 |
| | | 705/26.3 |
| 2017/0109400 A1 | 4/2017 | Moore |
| 2017/0329840 A1* | 11/2017 | McGowan .......... G06F 3/04815 |
| 2018/0260838 A1* | 9/2018 | New ................. G06Q 30/0239 |
| 2018/0300801 A1* | 10/2018 | Chen ................. G06Q 30/0643 |

* cited by examiner

ELECTRONIC COMPONENT SOURCING USER INTERFACE

CROSS-REFERENCE TO RELATED APPLICATIONS

This application is a continuation of U.S. patent application Ser. No. 16/134,804, filed on Sep. 18, 2018, which claims priority to provisional patent application Ser. No. 62/662,677, filed on Apr. 25, 2018, the entire contents of which is expressly incorporated herein by reference.

STATEMENT RE: FEDERALLY SPONSORED RESEARCH/DEVELOPMENT

Not Applicable

BACKGROUND

1. Technical Field

The present disclosure relates generally to electronic component sourcing, and more particularly, to a graphical user interface for electronic component sourcing.

2. Related Art

In the age of e-commerce, purchasers of electronic components are able to place orders with competing vendors of any size located anywhere in the world. Such freedom of choice puts additional strain on resources as purchasers have to compare various factors across a high number of candidate vendors when choosing a vendor for a particular purchase.

BRIEF SUMMARY

The present disclosure contemplates various systems, methods, and apparatuses for overcoming the above drawbacks accompanying the related art. A graphical user interface displays a matrix of competing offers of an electronic component of interest, each offer represented by a data point plotted with respect to a unit price axis and a lead time axis. By viewing the matrix, a person can immediately ascertain which offers are most attractive in terms of unit price and lead time and can intuitively weigh offers against one another, even in cases where one offer may have a better unit price while the other has a better lead time. When the person wishes to place an order for an electronic component, he/she may simply click, tap, or otherwise interact directly with a data point on the matrix to select an offer. In response to the person's selection, a purchase order panel adjacent to the matrix is populated with the details of the selected offer. The person may then proceed with the purchase or select a different offer.

One aspect of the embodiments of the present disclosure is a non-transitory program storage medium on which are stored instructions executable by a processor or programmable circuit to perform operations for generating a graphical user interface for electronic component sourcing. The operations include displaying a first axis marked in units of price, displaying a second axis marked in units of time, the second axis perpendicular to the first axis, and plotting a plurality of data points with respect to the first axis and the second axis, each of the plurality of data points corresponding to an offer to sell the electronic component and defining an ordered pair having a first value, plotted along the first axis, representative of a unit price of the electronic component and a second value, plotted along the second axis, representative of a lead time associated with purchasing the electronic component. The operations may further include displaying a purchase order panel, adjacent to the first and second axes, by which a user of the graphical user interface may initiate a purchase of the electronic component according to a selected offer and populating the purchase order panel with the unit price of the electronic component according to the selected offer in response to a user interaction with a corresponding one of the data points.

The operations may include displaying an offer list, each item of the offer list corresponding to one of the plurality of data points. The operations may include positioning an indicator with respect to an item of the offer list in response to a user interaction with a corresponding one of the data points. Each item of the offer list may include a display of any price breaks associated with the corresponding offer. Each item of the offer list may include a purchase order quantity input field and a display of a subtotal that is calculated in response to a quantity entered by a user in the purchase order quantity input field, the calculation of the subtotal taking into account any price breaks associated with the corresponding offer. Each item of the offer list may include a display of a minimum order quantity and a minimum packaging quantity associated with the corresponding offer, and the purchase order quantity input field may prevent entry of a quantity that violates the minimum order quantity or the minimum packaging quantity.

The purchase order panel may include a purchase order quantity input field and a display of a subtotal that is calculated in response to a quantity entered by a user in the purchase order quantity input field, the calculation of the subtotal taking into account any price breaks associated with the selected offer. The purchase order panel may include a display of a minimum order quantity and a minimum packaging quantity associated with the selected offer, and the purchase order quantity input field may prevent entry of a quantity that violates the minimum order quantity or the minimum packaging quantity.

Each of the plurality of data points may be a different color, and the purchase order panel may include an element whose color changes to match the color of the data point corresponding to the selected offer.

The operations may include displaying a filter menu by which a user of the graphical user interface may limit the plurality of data points in accordance with one or more chosen filters. The filter menu may include one or more filters selected from the group consisting of full factory packaging, partial factory packaging, manufacturer direct vendor, franchised distributor vendor, stock delivery, lead time delivery, tape and reel packaging, cut tape packaging, tray packaging, tube packaging, ammo packaging, bulk packaging, and manufacturing date code more than two years old. The plurality of data points may be limited to a predetermined number in accordance with a selected ranking criterion. The filter menu may allow the user to designate the selected ranking criterion from among one or more ranking criteria. The one or more ranking criteria may include lowest unit price and shortest lead time. The one or more ranking criteria may include a best offer criterion that is a function of unit price and lead time. The operations may comprise adjusting the first axis and the second axis to accommodate a change in the plurality of data points in response to a user interaction with the filter menu.

Another aspect of the embodiments of the present disclosure is a method of generating a graphical user interface for electronic component sourcing. The method includes displaying a first axis marked in units of price, displaying a second axis marked in units of time, the second axis perpendicular to the first axis, and plotting a plurality of data points with respect to the first axis and the second axis, each of the plurality of data points corresponding to an offer to sell the electronic component and defining an ordered pair having a first value, plotted along the first axis, representative of a unit price of the electronic component and a second value, plotted along the second axis, representative of a lead time associated with purchasing the electronic component. The method may further include displaying a purchase order panel, adjacent to the first and second axes, by which a user of the graphical user interface may initiate a purchase of the electronic component according to a selected offer and populating the purchase order panel with the unit price of the electronic component according to the selected offer in response to a user interaction with a corresponding one of the data points.

The method may include displaying an offer list, each item of the offer list corresponding to one of the plurality of data points.

Another aspect of the embodiments of the present disclosure is a system for generating a graphical user interface for electronic component sourcing. The system includes a server in communication with a user device and a program storage medium on which are stored instructions executable by the server to perform operations for generating a graphical user interface for electronic component sourcing, the graphical user interface accessible by the user device via a web browser or mobile application of the user device. The operations include displaying a first axis marked in units of price, displaying a second axis marked in units of time, the second axis perpendicular to the first axis, and plotting a plurality of data points with respect to the first axis and the second axis, each of the plurality of data points corresponding to an offer to sell the electronic component and defining an ordered pair having a first value, plotted along the first axis, representative of a unit price of the electronic component and a second value, plotted along the second axis, representative of a lead time associated with purchasing the electronic component. The operations may further include displaying a purchase order panel, adjacent to the first and second axes, by which a user of the graphical user interface may initiate a purchase of the electronic component according to a selected offer and populating the purchase order panel with the unit price of the electronic component according to the selected offer in response to a user interaction with a corresponding one of the data points.

The operations may include displaying an offer list, each item of the offer list corresponding to one of the plurality of data points.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
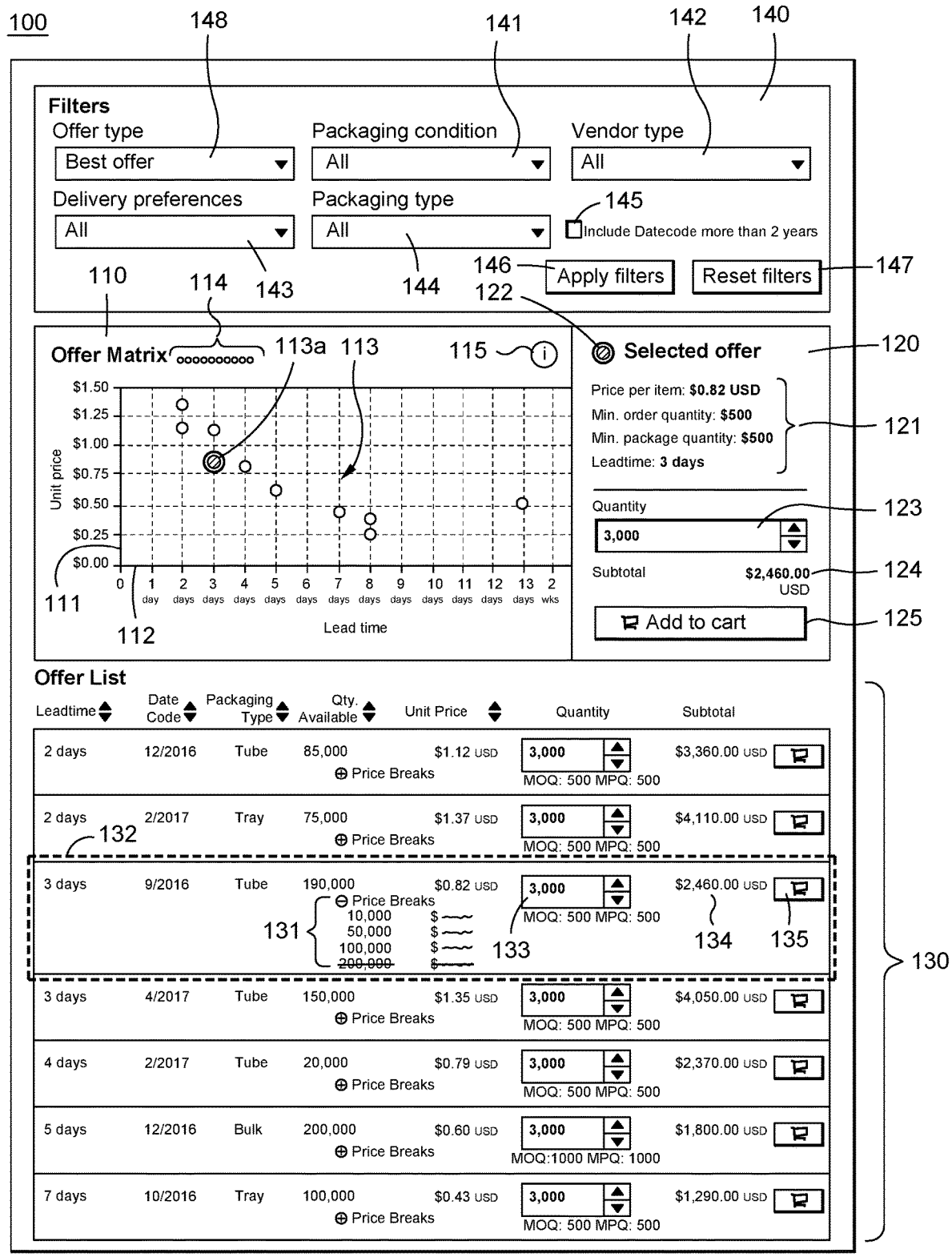
FIG. 1 shows an example electronic component sourcing graphical user interface (GUI) according to an embodiment of the present disclosure.

The present disclosure encompasses various embodiments of systems, methods, and apparatuses for generating a graphical user interface for electronic components sourcing. Referring to FIG. 1, an electronic component sourcing graphical user interface (GUI) 100 may include an offer matrix region 110 where a plurality of data points 113 are displayed representing competing offers to sell an electronic component of interest. The data points 113 may be displayed as a sourcing grid or offer matrix plotted with respect to a unit price axis 111 and a lead time axis 112. For example, each of the data points 113 may define an ordered pair having a first value that is representative of a unit price of the electronic component and a second value that is representative of a lead time associated with purchasing the electronic component, with the first value being plotted along the unit price axis 111 and the second value being plotted along the lead time axis 112.

When a user is deciding which vendor to use for the electronic component, the offer matrix may serve as an intuitive visual aid for comparing offers. At a glance, a user may immediately see which offers are the least expensive and which offers have the shortest lead times. Moreover, since the offer matrix provides a visual representation of how much the unit prices and lead times differ between offers, the user may also easily compare competing offers in a situation where one has a better unit price and the other has a better lead time. When the user has made up his/her mind and would like to purchase the electronic component, the user may click, tap, or otherwise interact with the data point 113 of the selected offer to automatically populate an adjacent purchase order panel 120 with the details of the selected offer. The user may then enter a desired quantity in a quantity input field 123 of the purchase order panel 120 and press an "Add to cart" button 125 to proceed with the purchase.

As shown in FIG. 1, the selected data point 113a (i.e. the data point 113 of the selected offer) may be circled, highlighted, or otherwise marked to clearly indicate which data point 113 is selected. As illustrated by the diagonal fill markings in FIG. 1, the color, grayscale value, shape or other distinguishing characteristic of the selected data point 113a may be replicated in a selected offer bubble or other element 122 of the purchase order panel 120. In this way, the user can easily understand which of the offers is currently represented in the purchase order panel 120 and the possibility that the user will inadvertently order the electronic component from the wrong vendor is reduced.

Figure 2:
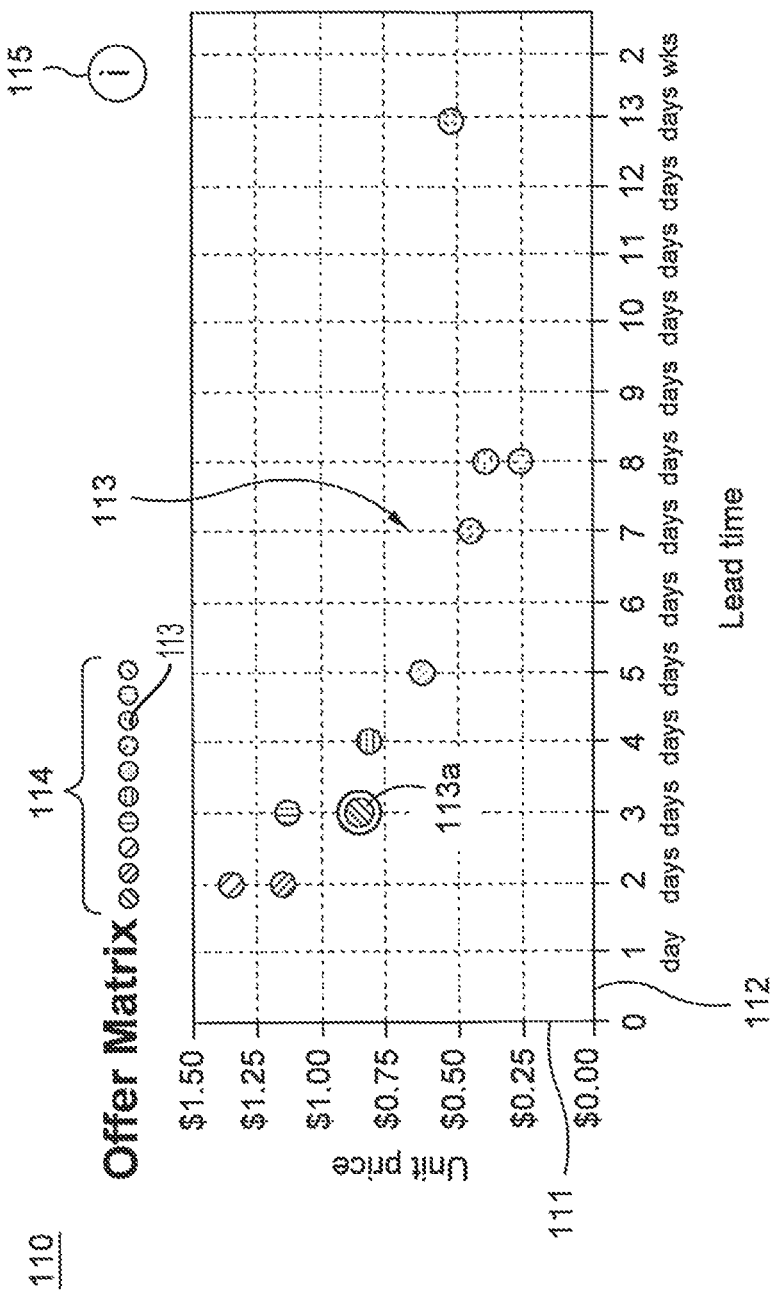
FIG. 2 shows a close-up view of an offer matrix of the electronic component sourcing GUI of FIG. 1.

FIG. 2 shows a close-up view of the offer matrix region 110, where it can be seen that each of the data points 113 may be a different color (or have a different distinguishing characteristic), with the current set of colors etc. displayed in a palette 114. Similar to the data points 113 shown in the graph of the offer matrix region 110, the data points 113 shown in the palette 114 may be visually correlated or visually identical to the data points 113 shown in the graph of the offer matrix region so that the data points in the palette 114 can be identified as being the same as or linked to the data points in the graph of the offer matrix region 110. For example, the corresponding data points on the graph and in the palette can be of the same color, shade of color, shape or other marking. The user may click, tap, or otherwise interact with the data point 113 located in the palette 114 to also automatically populate the adjacent purchase order panel 120 with details of the selected offer just as it is in the case of the data points 113 in the graph portion of the offer matrix region. Also, when the user clicks, taps or otherwise interacts with the data point 113 located in the palette 114, such action may highlight or identify the corresponding data point in the graph of the offer matrix region. In FIG. 2, the different fills of each data point 113 may represent a different color. The palette 114 may be modifiable, for example, by clicking to open up a color selector tool, allowing the user to designate which colors or other distinguishing characteristics are used (e.g. in case the user has difficulty distinguishing between certain colors). As the user clicks on different data points 113 of the offer matrix region 110 or the palette 114, the circle or other marking indicating the selected data point 113a moves to each newly selected data point 113a and the color or other distinguishing characteristic of each newly selected data point 113a is reproduced as the selected offer element 122 in the purchase order panel 120 (see FIG. 1).

The palette 114 and the offer matrix region 110 may also be customizable in the following way. In the drawing, ten (10) data points 113 are shown. However it is also contemplated that any number of data points 113 may be shown in the offer matrix region 110 and the palette 114. For example, in certain instances, the user may want to display fewer data points 113 or more data points 113. The user can have that option to display fewer or more data points 113. To accomplish this, the user may double click on the offer matrix 114 to bring up the option (e.g., pop up screen) of displaying fewer or more data points 113. The data points 113 shown in the palette 114 may operate or affect the purchase order panel 120 and the data points 113 shown in the graph of the offer matrix region 110. By way of example and not limitation, when the user clicks on one of the data points 113 shown in the palette 114, the selected data point 13 may become circled, highlighted or otherwise marked to clearly indicate which data point 113 in the palette is being selected. Moreover, the data point 113 shown in the graph of the offer matrix region 110 corresponding to the selected data point 113 in the palette 114 may also have a corresponding marking as the selected data point 113 in the palette 114. Also, by selecting one of the data points 113 in the palette 114, the selected offer bubble or element 122 in the purchase order panel 120 may also be updated to identically mimic the marking of the data point 113 in the palette and the graph of the offer matrix region 110. In this way, all three of the data points 113 in the palette and the offer matrix region 110 and the selected offer bubble or element 122 are visually linked to each other so that the user can quickly identify which one is selected and no confusion exists between the information displayed in the purchase panel 120 and the offer matrix region 110 and the palette 114.

The palette 114 is shown as being inside of the offer matrix region 110. However, it is also contemplated that the palette 114 may be positioned outside of the offer matrix region 110 or inside or outside of the purchase panel 120 so long as the palette 114, graph of the offer matrix region and the purchase panel 120 are preferably viewable on a computer monitor at the same time. However, it is also contemplated that any two of the three items (i.e., data point of the palette 114, data point on the graph of the offer matrix region 110 or the selected offer bubble or element 122) are on viewable on the computer monitor at the same time.

The electronic component sourcing GUI 100 may further include an offer list 130. For example, as shown in FIG. 1, the offer list 130 may be positioned below the offer matrix region 110 with the purchase order panel 120 positioned to the right-hand side of the offer matrix region 110. The offer list 130 may be a list of items (e.g. horizontal rows in FIG. 1) each of which corresponds to one of the data points 113 of the offer matrix (possibly marked with a corresponding color from the palette 114). In FIG. 1, list items corresponding to three of the ten data points 113 are omitted in order to save space in the drawing, but the offer list 130 may include list items for all of the data points 113 (displayed all at once or by scrolling, multiple pages, etc.). It is contemplated that the list items in the offer list 130 may correspond to the same number of data points 113 in the palette and the offer matrix region. However, it is also contemplated that the number of list items may be greater than or less than the number of data points 113. For example, there can be 10 data points 113 and 20 list items and vice versa. Whereas the offer matrix region 110 may provide the user with a visual way of comparing multiple offers, the offer list 130 may provide a tabular list and also may provide additional details of each offer. For example, each item of the offer list 130 may include a lead time (e.g. days, weeks, months to order fulfillment or delivery), a manufacturing date code (e.g. week and year of production), a packaging type (e.g. tape and reel, cut tape, tray, tube, ammo, bulk), an available quantity of the electronic component, and a unit price of the electronic component including any information about price breaks (e.g. volume price). It is contemplated that the offer list 130 may display lead time more specifically than the lead time axis 112 of the offer matrix region 110. For example, the offer list 130 may display lead time in days while the lead time axis 112 displays lead time in weeks (e.g. business weeks of five working days).

An expandable and collapsible price breaks button 131, located adjacent to the unit price for each item of the offer list 130, may be provided to display price break information. By interacting with a collapsed price breaks button 131 (e.g. represented by a "+" symbol), a user may expand the price breaks button 131 to an expanded state (e.g. represented by a "−" symbol) as shown, causing the list item to increase in size within the offer list 130 to accommodate the expanded area for providing price break information. With this functionality provided in the offer list 130, a user can take into consideration price breaks when selecting an offer or a purchase quantity.

The offer list 130 may be displayed as a table where each list item is a row and the information of the offer is organized into columns with column headings (e.g. "lead time," "date code," "packaging type," "quantity available," and "unit price") as shown in FIG. 1. The offer list 130 may include sorting functionality where the items (e.g. rows) may be sorted according to "lead time," "date code," "packaging type," "quantity available," and "unit price" by interacting with sort buttons such as the arrows shown next to each column heading in FIG. 1. In the example of FIG. 1, the offer list 130 has been sorted by lead time with shorter lead times appearing earlier in the list. Runs of two or more list items having the same lead time are sorted by unit price with lower unit prices appearing earlier. This may reflect, for example, the user having sorted the offer list 130 by lead time after sorting the offer list 130 by unit price. The order of items in the offer list 130 may also reflect a default or selected ranking criterion as described below.

As the user clicks on different data points 113 of the offer matrix and the selected data point 113a changes accordingly, a list item indicator 132 moves correspondingly through the offer list 130 to be positioned on the list item corresponding to the selected data point 113a. In the example of FIG. 1, the user has selected the data point 113a having a lead time of 3 days and a unit price of $0.82, so the list item indicator 132 is positioned to indicate the same offer in the offer list 130, allowing the user to view details of the offer beyond the information of the offer matrix. The list item indicator 132 may be a dashed box or other outline as shown (which may grow or shrink depending on the state of the price breaks button 131) or may be an arrow, dot, color, highlight, or any other indicator that clearly indicates a selected list item. As noted above, the purchase order panel 120 may populate to reflect the selected offer as each new data point 113 is selected. Thus, both the purchase order panel 120 and the list item indicator 132 may simultaneously be updated to reflect the selected data point 113a. It is further envisioned that the user may instead choose to click, tap, or otherwise interact with items of the offer list 130 directly to select another offer, in which case the list item indicator 132 may move to the newly selected offer, causing a new data point 113 to be marked as the selected data point 113a in the offer matrix and the purchase order panel 120 to be populated with the information of the newly selected offer. In this way, a user may freely select offers using the offer matrix and/or the offer list 130 and the remainder of the electronic component sourcing GUI 100 may be updated accordingly to synchronize the information displayed in the offer matrix region 110, purchase order panel 120, and offer list 130.

Each item of the offer list 130 may further include functionality such as a quantity input field 133, a subtotal that reflects the quantity entered in the quantity input field 133 (e.g. unit price multiplied by entered quantity modified by any price breaks), and an "Add to cart" button 135. When the user wishes to proceed with a purchase order, he/she may do so directly from the offer list 130 by entering the desired quantity in the quantity input field 133 and clicking the "Add to cart" button 135. In this way, the user may freely place purchase orders using either or both of the purchase order panel 120 and the offer list 130.

When a user has selected an offer and is ready to place an order, the user may enter a desired quantity using the quantity input field 123 of the purchase order panel 120 or the quantity input field 133 of the offer list 130 as described above. The purchase order panel 120 and offer list 130 may further include a display of a minimum order quantity (MOQ) and a minimum packaging quantity (MPQ) associated with each offer (e.g. included in the offer details 121 displayed in the purchase order panel 120). The quantity input field 123, 133 may prevent entry of a quantity that violates the minimum order quantity or the minimum packaging quantity. For example, when an invalid entry is entered, the entered quantity may automatically be bumped down to the next highest quantity that satisfies the minimum order quantity and the minimum packaging quantity. A warning may also be displayed indicating that the entered quantity was invalid and highlighting any automatic adjustment for the user or indicating that new entry must be made to the quantity input field 123, 133. The subtotal 124, 134 may reflect the quantity entered in the quantity input field 123, 133 (e.g. unit price multiplied by entered quantity modified by any price breaks) after any such adjustment.

The electronic component sourcing GUI 100 may further include a filter menu 140 by which the user may limit the data points 113 in accordance with one or more chosen filters. The filters may include, for example, packaging condition filters 141 such as full factory packaging and partial factory packaging, vendor type filters 142 such as manufacturer direct vendor and franchised distributor vendor, delivery preference filters 143 such as stock delivery and lead time delivery, packaging type filters 144 such as tape and reel packaging, cut tape packaging, tray packaging, tube packaging, ammo packaging, and bulk packaging, and a date code filter 145 allowing the user to include or exclude offers for electronic components having a manufacturing date code more than two years old. Additional example of filters may include, for example, reliability or popularity filters (e.g. vendors having an average user rating above a threshold, vendors having a number of user reviews above a threshold, vendors having some reliability certification applied in the industry, etc.), item-specific filters that relate to the technical aspects of the specific electronic component, country/region of origin filters, etc. As shown in FIG. 1, some of the filters (e.g. packaging condition filters 141, vendor type filters 142, delivery preference filters 143, and packaging type filters 144) may be organized into drop-down menus or other selectors allowing a user to select individual filters from a list or choose to select no filters within a given category (e.g. by selecting "All"). Other filters (e.g. date code filter 145) may be selected by checking or unchecking a checkbox or radio button.

After having selected one or more filters, the user may click an apply filters button 146 to apply the selected filters and limit the data points 113 accordingly. For example, rather than viewing all offers for a given electronic component, a user may wish to view only manufacturer direct vendor offers sold in tube packaging. The user may select the appropriate vendor type filter 142 and packaging type filter 144 and click apply filters 146, and the offer matrix will automatically be updated to display only those data points 113 corresponding to offers meeting the user's conditions. If the user would like to re-expand his/her inquiry, a reset filters button 147 may be used to deselect all filters and display a larger, unfiltered set of data points 113.

It is contemplated that, even with no filters applied, the electronic component sourcing GUI 100 may display only a subset of data points 113 out of all the available offer data. For example, the electronic component sourcing GUI 100 may display only the most attractive offers according to a ranking criterion and a predetermined number of offers to display (e.g. 10, 20, 50, 100, etc.). Ranking criteria may include, for example, unit price (e.g. the ten offers having the lowest unit price after filters are applied), lead time (e.g. the ten offers having the shortest lead time after filters are applied), and/or "best offer" as described below. To this end, the filter menu 140 may further include a ranking criterion selector 148 (e.g. a drop-down menu) that allows the user to designate the selected ranking criterion from among one or more ranking criteria. While it is not specifically shown in FIG. 1, it is further envisioned that the predetermined number of offers (e.g. 10, 20, 50, 100, etc.) may also be designated by the user. The ranking criterion selector 148 may have a default setting (e.g. "best offer" as shown in FIG. 1) on the basis of which the data points 113 are initially generated. Thereafter, when the user selects a different ranking criterion using the ranking criterion selector 148, the offer matrix will automatically be updated to display only those data points 113 corresponding to the most attractive offers according to the selected ranking criterion. In this way, the electronic component sourcing GUI 100 may adjust as the relative importance of unit price and lead time vary from user to user and from purchase order to purchase order.

For example, a user who is relatively unconcerned with lead time for a given purchase may wish to consider only those offers having the lowest price.

It is further contemplated that, with a large database of offers, there may be offers that are the same in all but one respect, such that one offer is for all intents and purposes inferior to the other (e.g. two offers with the same packaging type, same unit price, etc. but different lead time). The electronic component sourcing GUI 100 may omit such inferior offers. Along the same lines, the electronic component sourcing GUI 100 may omit duplicate offers.

The "best offer" ranking criterion may be defined to reflect a balance between unit price and lead time. As such, the "best offer" criterion may rank offers by a value that is a function of unit price and lead time. For a given offer represented by a data point defining an ordered pair of unit price and lead time, such value may, for example, be a position of the data point on a Cartesian plane, such as a distance of the data point from the origin, which may be expressed as $$\sqrt{p^2+t^2}$$

where p is the unit price of the offer in price units (e.g. dollars) and t is the lead time in time units (e.g. 1 day). According to the "best offer" criterion, the most attractive offer may be the offer that minimizes this value, which may be expressed as $$\min_{t,p}\{\sqrt{p^2+t^2}\}$$

or, if some maximum unit price $p_{target}$ and/or maximum lead time $t_{target}$ is applied as an additional constraint, $$\min_{t\le t_{target}, p\le p_{target}}\{\sqrt{p^2+t^2}\}$$

where offers exceeding a maximum unit price or a maximum lead time are excluded. The selection of price units and time units, as well as the form of the function itself, may be optimized so that the function is predictive of how a customer would rank the attractiveness of the offers. To this end, machine learning may be employed based on feedback of which offers are actually selected for purchase (by all customers or by the particular customer). Designation of a maximum unit price $p_{target}$ and/or maximum lead time $t_{target}$ may be made by a user. In some cases, for example, the capability of a user to designate a maximum unit price $p_{target}$ and/or maximum lead time $t_{target}$ may be limited to when the user requests electronic component sourcing based on an uploaded bill of materials (BOM) and may be unavailable when a user only conducts a single part search. It is also contemplated that the maximum unit price $p_{target}$ and/or maximum lead time $t_{target}$ may be set to be 10% higher than a value input by a user, in order not to exclude offers that are very close to meeting the user's requirements.

Most attractive offers according to unit price, lead time, and best offer ranking criteria may be formally defined as follows, with ∀ meaning "for all," s.t. meaning "such that," and ∈ meaning "in (element of)." Given a set N of n tuples of prices p and lead times t, $\{p_i, t_i\}$, $1\le i\le n$, a best price may be defined as:

$$\min_{i,j} p_i \text{ s.t. } t_i \le t_j \text{ whenever } p_i = p_j, i \ne j \, \forall \, i, j \in N$$

where the tuple with the smallest unit price is picked and the tuple with the smaller lead time is picked whenever two tuples have the same unit price.

A fastest delivery may be defined as:

$$\min_{i,j} t_i \text{ s.t. } p_i \le p_j \text{ whenever } t_i = t_j, i \ne j \, \forall \, i, j \in N$$

where the tuple with the smallest lead time is picked and the tuple with the smaller unit price is picked whenever two tuples have the same lead time.

A best offer may be defined as the tuple with the smallest Euclidean distance from the origin:

$$\min_i \sqrt{p_i^2 + t_i^2}$$

where the Euclidean distance d of a point (x,y) from the origin may be defined as:

$$d=\sqrt{x^2+y^2}$$

Other examples of ranking criteria include "best offer by unit price," which may rank offers according to a function of unit price and lead time that more strongly weights unit price, e.g.

$$\min_{t\le t_{target}, p\le p_{target}}\{\sqrt{p^2+t^2}+p\}$$

in which an additional p term causes offers with low unit prices to be ranked as more attractive, and "best offer by lead time," which may rank offers according to a function of unit price and lead time that more strongly weights lead time, e.g.

$$\min_{t\le t_{target}, p\le p_{target}}\{\sqrt{p^2+t^2}+t\}$$

in which an additional t term causes offers with low lead times to be ranked as more attractive.

Referring to the equations referenced above where p and t are being added to each other, the units of p may be dollars (i.e., 1 dollar increments) and the units of t may be days (i.e., 1 day increments) as noted above. For example, a first electronic component having a unit cost of 5 and a lead time of five days might be evaluated according to the "best offer" criterion as √(5^2+5^2)≈7 while a second electronic component having a unit cost of $4 and a lead time of seven days might be evaluated as √(4^2+7^2)≈8, indicating that the first electronic component is the more attractive offer. On the other hand, if the units of p is 20-cent increments and the units of t is 5-day increments, the same two electronic components might be evaluated as √(25^2+1^2)≈25 and √(20^2+1.4^2)≈20, indicating that the second electronic component is the more attractive offer. Thus, in order to change the relative importance of unit price and lead time when evaluating the "best offer" and other criteria, the price and time units can be adjusted to change the relative emphasis of unit price and lead time in determining which offers are more or less attractive. For example, using a larger lead time unit would result in a smaller quantity of that unit and effectively deemphasize lead time so that the price would play more of a factor in determining the best offer, and vice versa. Also, using a larger price unit would result in a smaller quantity of that unit and effectively deemphasize price so that the lead time would play more of a factor in determining the best offer, and vice versa. While the preferred units are dollars and days as noted above, it is contemplated that price units might vary, e.g. between 1-cent increments and $100 increments, and that time units might vary, e.g. between 0.5 day-increments and 30 day-increments. Alternatively, or additionally, weighting coefficients $w_1$, $w_2$, etc. may be added to the above formulas in front of each term (e.g. $\sqrt{(w_1 p^2 + w_2 t^2)} + w_3 t$), where the coefficients may be adjusted to emphasize or deemphasize individual terms of the formulas.

It is further contemplated that the selection of a ranking criterion may be indicated in some intuitive way in the offer matrix region 110 of the electronic component sourcing GUI 100. For example, in a case where a "best offer" criterion minimizes a value representing a distance of each data point from a point on a Cartesian plane such as the origin, selection of the "best offer criterion" using the ranking criterion selector 148 may cause a diagonal line to be drawn in the offer matrix region 110 between this point and each data point 113 (or between this point and the most attractive data point according to the "best offer" criterion). As another example, selection of a lowest unit price criterion may cause a vertical line to be drawn to one or more data points 113 from the lead time axis 112 such that the length of the line illustrates the unit price. As another example, selection of a shortest lead time criterion may cause a horizontal line to be drawn to one or more data points 113 from the price axis 111 such that the length of the line illustrates the lead time. Other ranking criteria such as "best offer by unit price" or "best offer by lead time" may be intuitively illustrated with a combination a diagonal line (as in the case of "best offer") and a vertical or horizontal line (as in the case of lowest unit price or shortest lead time, respectively). By seeing such intuitive representation of the selected ranking criterion in the offer matrix region 110, a user may be able to more easily grasp why a particular set of data points 113 was returned by the electronic component sourcing GUI 100.

Figure 3:
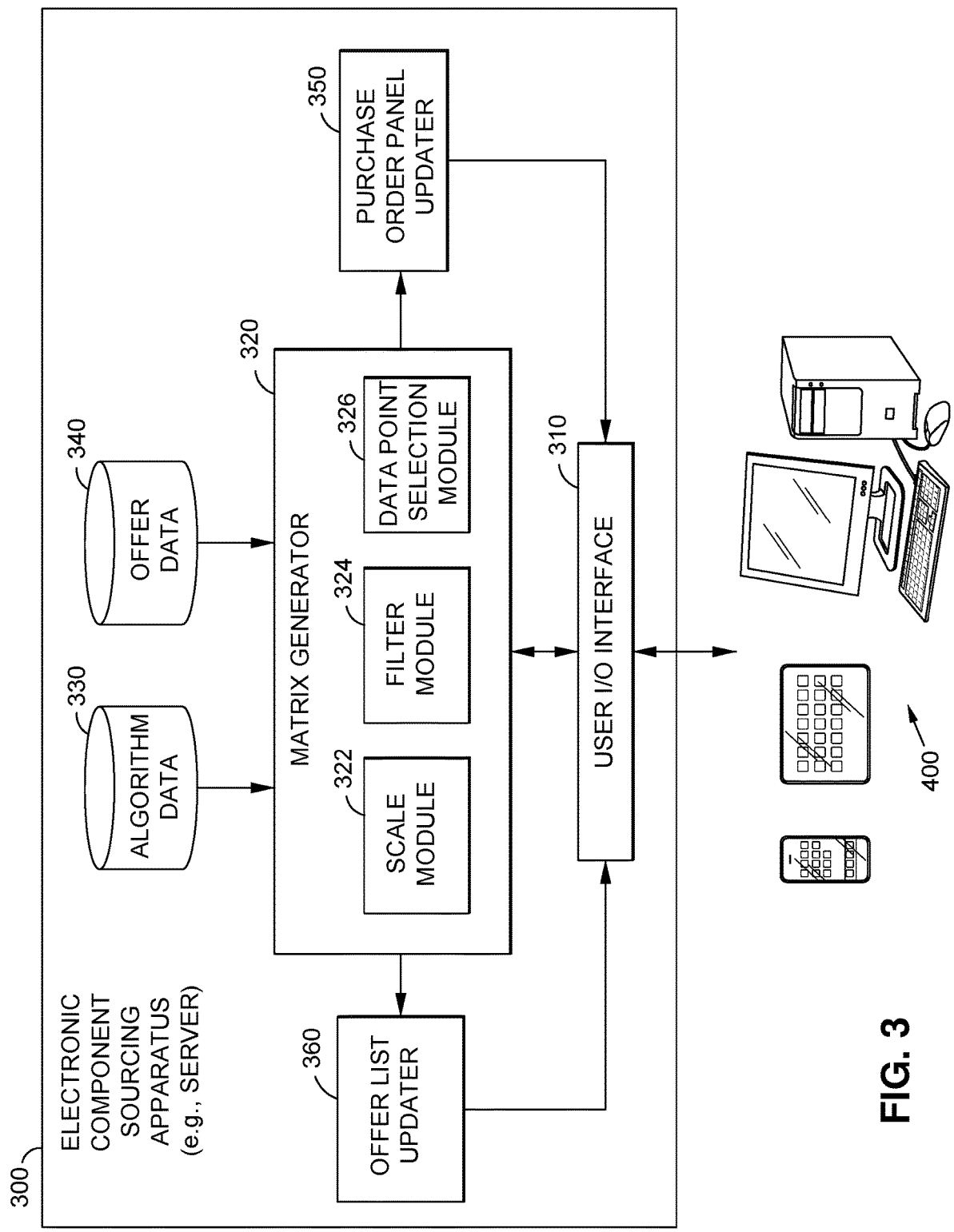
FIG. 3 shows an example electronic component sourcing apparatus according to an embodiment of the present disclosure.

FIG. 3 shows an example electronic component sourcing apparatus 300 according to an embodiment of the present disclosure. The electronic component sourcing apparatus 300 may be a server a combination of networked servers that interacts with a web browser or mobile application of a customer device 400 in order to generate the electronic component sourcing GUI 100 described above. The electronic component sourcing apparatus 300 may include a user I/O interface 310, a matrix generator 320, an algorithm data storage 330, an offer data storage 340, a purchase order panel updater 350, and an offer list updater 360.

The user I/O interface 310 may receive data from and transmit data to a web browser or mobile application of a customer device 400. Input data may include, for example, user interaction data of a user with the electronic component sourcing GUI 100, such as the selection of a selected data point 113a, selection of filters (including ranking criteria) in the filter panel 140, entry of a purchase order quantity in a quantity input field 123, 133, or interaction with an "Add to cart" button 125, 135. Input data my further include a search query, part number entry, sourcing request, preference selection, login information, or other data entered on a previous screen of the electronic component sourcing GUI 100, in response to which the electronic component sourcing apparatus 300 may display the elements of the electronic component sourcing GUI 100 described in relation to FIGS. 1 and 2. Output data of the user I/O interface 310 may include data to be interpreted by a web browser or mobile application in the generation of a display in accordance with the electronic component sourcing GUI 100 described herein. In this regard, it should be noted that the terms "displaying," "plotting," "populating," etc. as used herein with respect to elements of the electronic component sourcing GUI 100 may include the outputting of data from the user I/O interface 310 or another component of the electronic component sourcing apparatus 300 for use by a customer device 400.

Based on the input data received by the user I/O interface 310, the matrix generator 320 may return an offer matrix of data points 113. For example, the offer data storage 340 may store offer data (e.g. catalog data) from many vendors worldwide, including, for each electronic component offered by the vendor, unit price, lead time, and any other information to be displayed by the electronic component sourcing GUI 100 (e.g. price breaks, minimum order quantity, minimum packaging quantity, packaging type, date code, etc.). When a user of a customer device 400 requests sourcing information for a particular electronic component, the matrix generator 320 may query the offer data storage 340 for the requested electronic component and return all offers for that electronic component or a subset of the offers (e.g. initially limited to a predetermined number of offers by a default ranking criterion such as "best offer") for display on the customer device 400. Based on the unit price and lead time of each returned offer, the matrix generator 320 may output data representative of display parameters for a price axis 111, a time axis 112, and a plurality of data points 113 as shown in FIG. 1. The matrix generator 320 may include a scale module 322, a filter module 324, and a data point selection module 326.

The scale module 322 may evaluate the set of returned offers to determine how best to display the data points 113 in the offer matrix region 110 of the electronic component sourcing GUI 100 such that the data points 113 may be discernible to the user's eye. For example, in a case where there is a relatively small difference between lowest and highest unit prices or between shortest and longest lead times, the scale module 322 may adjust the scale of the corresponding axis to avoid clumping of data points 113. As another example, in a case where the differences between unit prices or lead times are much less than the absolute values thereof, the scale module may create a break in the corresponding axis or generate an off-zero intersection point of the axes in order to produce a view that is appropriately zoomed in on the data points 113.

The filter module 324 may modify the returned set of offers and/or the query to the offer data storage 340 to limit the displayed data points 113 in accordance with any filters and ranking criteria applied by the user. For example, the matrix generator 320 may have already queried the offer data storage 340 for a requested electronic component and returned a subset of the offers (e.g. the 10 most attractive offers according to a default "best offer" criterion) for display on the customer device 400. When the user of the customer device 400 applies one or more filters 141, 142, 143, 144, 145 using the apply filters button 146, the filter module 324 may receive data indicative of the applied filters from the user I/O interface 310, apply corresponding constraints to the query, and instruct the matrix generator 320 to again query the offer data storage 340, this time with the added constraints imposed by the one or more filters 141, 142, 143, 144, 145. Based on the newly returned set of offers, the matrix generator 320 may again output data for the price axis 111, time axis 112, and plurality of data points 113 including any adjustments made by the scale module 322 in light of the new set of offers. When the user removes all filters using the reset filters button 147, the filter module 324 may remove the constraints from the query and instruct the matrix generator 320 to query the offer data storage 340 without the constraints, the output of the matrix generator 320 changing accordingly.

When the user selects a new ranking criterion (e.g. lowest unit price) using the ranking criterion selector 148, the filter module 324 may receive data indicative of the selected ranking criterion from the user I/O interface 310 and apply corresponding constraints to the query to be made to the offer data storage 340 (e.g. return only the 10 offers with the lowest price). To this end, the filter module 324 may reference the algorithm data storage 330 for a corresponding algorithm to determine the appropriate constraints. For example, the algorithm data storage 330 may store a look-up table of algorithms for each selection in the ranking criterion selector 148. For example, in a case where the user has chosen the "best offer" criterion or where the "best offer" criterion is chosen by default, the filter module 324 may find, in the algorithm data storage 330, a corresponding algorithm to calculate a specified function of unit price and lead time for each offer in the offer data storage 340 and return a predetermined number (e.g. 10) of offers having the lowest function value as described above. The predetermined number of offers to return may also be stored in the algorithm data storage 330.

In some embodiments, the algorithms and/or the predetermined number of offers may be adjusted by user preference, either on a per query basis (e.g. using a preferences button in the filter menu 140) or as a preference associated with the particular user (e.g. using a preferences button on a user profile page of the electronic component sourcing GUI 100). It is further contemplated that the algorithm data storage 330 may be automatically and continually updated by the filter module 324 using machine learning as described above. For instance, when a user makes a purchase order, the filter module 324 may compare the user's actually purchased offer with the offer that would be the "best offer" according to the algorithm associated with the "best offer" criterion. Based on such feedback, the filter module 324 may modify the algorithm associated with the "best offer" criterion (e.g. by adjusting price units and time units and/or the form of a function defined by the algorithm) in order to better predict which offers will actually be considered the best by the user. For example, a registered user of the electronic component sourcing apparatus 300 may securely log in via a web browser or mobile application, and the filter module 324 may store the modified algorithm in the algorithm data storage 330 with respect to the specific logged in user. In this way, the filter module 324 and algorithm data storage 330 may be used to tailor the ranking criteria to a particular user's purchasing habits. It is also contemplated that the number of offers or data points may be fixed, predetermined or hard coded into the program so as to provide the same numbers of offers or data points 113 to every user of the software. Optionally, the number of offers or data points 113 is not be variable based on an algorithm or other sort of customization or adjustment.

Having applied the appropriate constraints to the query based on the algorithm associated with the new ranking criterion, the filter module 324 may instruct the matrix generator 320 to again query the offer data storage 340. Based on the newly returned set of offers, the matrix generator 320 may again output data for the price axis 111, time axis 112, and plurality of data points 113 including any adjustments made by the scale module 322 in light of the new set of offers. In this way, the offer data retrieved from the offer data storage 340 may be filtered both according to selected filters 141, 142, 143, 144, 145 and a designated ranking criterion from the ranking criterion selector 148 to produce the data points 113 of the offer matrix.

The data point selection module 326 may receive the user's selection or a default selection of one of the data points 113 (i.e. a selected data point 113a) and output data for the display of a circle, highlight, or other mark on the selected data point 113a. In this regard, a default selection of one of the data points 113 may be, for example, the data point associated with the most attractive offer according to the currently selected ranking criterion (e.g. "best offer," lowest price, shortest lead time, etc.), such that the selected data point 113a automatically changes as the user changes the selected ranking criterion using the ranking criterion selector 148. The data point selection module 326 may further output data indicative of the selected data point 113a to the purchase order panel updater 350 and the offer list updater 360. As described above, each of the data points 113 may be displayed in a different color (or with another distinguishing characteristic), e.g. in accordance with a palette 114. Such color data may be included with the output data of the matrix generator 320 as part of the data for the display of the electronic component sourcing GUI 100. The data point selection module 326 may additionally attach the color data (or other data associated with a distinguishing characteristic) of the selected data point 113a to the data to be output to the purchase order panel updater 350. In this way, the color or other characteristic may be replicated in the selected offer bubble or other element 122 of the purchase order panel 120 by the purchase order panel updater 350.

The purchase order panel updater 350 may output data representative of display parameters for the purchase order panel 120 as shown in FIG. 1. As described above, the selection of a data point 113, either manually or by default, may cause the purchase order panel 120 to populate with the information of the offer corresponding to the selected data point 113a. To this end, the purchase order panel updater 350 may receive the offer data of the selected data point 113a from the matrix generator 320 (e.g. the data point selection module 326) and output the display data accordingly. If the data received from the matrix generator 320 includes color data as described above, the display data output by the purchase order panel updater 350 may include data to replicate the color (or other distinguishing characteristic) of the selected data point 113a in the element 122 of the purchase order panel 120. In this way, the user may easily understand, at a glance, which of the offers currently occupies the purchase order panel 120.

The offer list updater 360 may output data representative of display parameters for the offer list 130 as shown in FIG. 1. As described above, the selection of a data point 113, either manually or by default, may cause the list item indicator 132 to move correspondingly through the offer list 130 to be positioned on a list item corresponding to the offer associated with the selected data point 113a. To this end, the offer list updater 360 may receive the offer data of the selected data point 113a from the matrix generator 320 (e.g. the data point selection module 326) and output the display data accordingly.

As described above, the user I/O interface 310 may output data to be interpreted by a web browser or mobile application in the generation of a display in accordance with the electronic component sourcing GUI 100 described herein. Such data may include data for displaying the offer matrix region 110 output by the matrix generator 320, data for displaying the purchase order panel 120 output by the purchase order panel updater 350, and data for displaying the offer list 130 output by the offer list updater 360, as well as various other data for displaying other static and dynamic elements of the electronic component sourcing GUI 100, including, for example, the filter menu 140, a help button 115, etc. By communicating such data to a web browser or mobile application of a customer device 400 (e.g. over a network such as the Internet), the electronic component sourcing apparatus 300 may be regarded as generating, updating, displaying, plotting, populating, etc. the various elements of the electronic component sourcing GUI 100.

Figure 4:
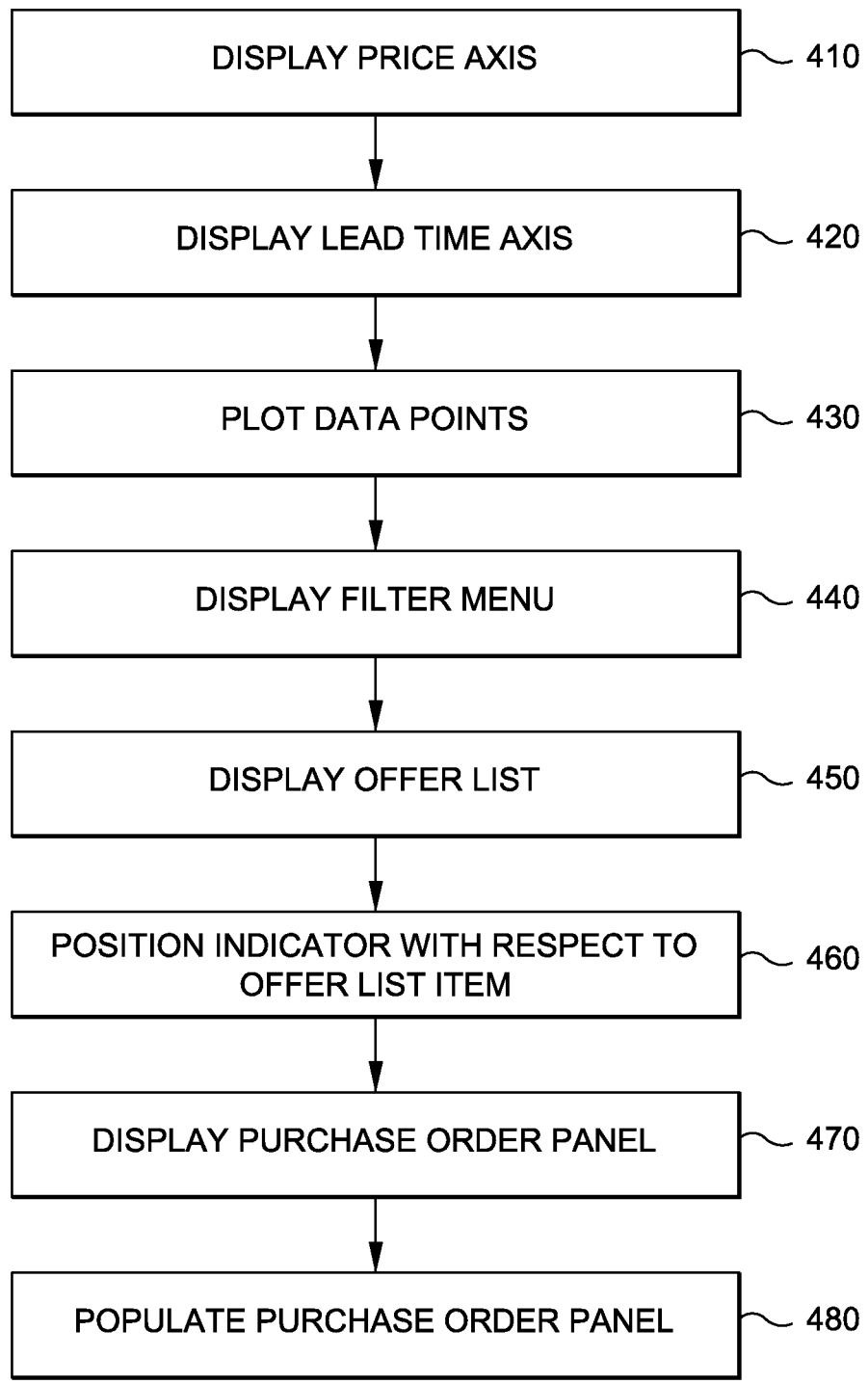
FIG. 4 shows an example operational flow according to an embodiment of the present disclosure.

FIG. 4 shows an example operational flow according to an embodiment of the present disclosure. Referring by way of example to the electronic component sourcing GUI 100 shown in FIGS. 1 and 2 and the electronic component sourcing apparatus 300 shown in FIG. 3, the electronic component sourcing apparatus 300 may, in any order or simultaneously in whole or in part, display a price axis 111 (step 410), display a lead time axis 112 (step 420), plot data points 113 with respect to the axes (step 430), display a filter menu 140 (step 440), display an offer list 130 (step 450), position an indicator 132 with respect to an item of the offer list 130 (step 460), display a purchase order panel 120 (step 470), and populate the purchase order panel 120 with offer information corresponding to a selected data point 113*a* (step 480). As noted above, the above steps may be preceded by and in response to a search query, part number entry, sourcing request, preference selection, login information, or other data entered on a previous screen of the electronic component sourcing GUI 100.

For example, in an exemplary use case, a registered user may log in on a website using his/her personal computer 400. By logging in, the user may be able to take advantage of features available to registered users, which might include, for example, viewing past electronic component searches conducted by the user, viewing and/or modifying a personally tailored "best offer" criterion or other ranking criterion for filtering offer data (including number of returned offers), and saving various display preferences (e.g. which colors or other distinguishing characteristics are defined by the palette 114). The user may begin a new search by entering a part number or other identifying information of an electronic component of interest (e.g. typing in one or more part numbers separated by commas, uploading a bill of materials, etc.) and making a request to view an offer matrix for the electronic component. Such a request to view an offer matrix may be made, for example, by clicking a button to "view all offers" on a search results page after verifying that a search result correctly matches the electronic component of interest. In response to such request, the electronic component sourcing apparatus 300 may initially perform steps 410-480 with respect to the electronic component of interest using default settings of the filter menu 140 (e.g. no filters 141, 142, 143, 144, 145 applied and a default "best offer" ranking criterion associated with the user). The user may be taken to a screen of the electronic component sourcing GUI 100 similar to the screen shown in FIG. 1, possibly with a selected data point 113*a* having been chosen automatically by default (e.g. the most appealing offer according to a default "best offer" criterion). The position indicator 132 may thus be positioned on the corresponding data point (step 460) and the purchase order panel 120 may be populated with the information of the corresponding offer (step 480).

While viewing the information on the screen, the user may wish to select a different data point 113 either located in the palette 114 or the offer matrix region 110 or a different item of the offer list 130. In response, the electronic component sourcing apparatus 300 may reperform step 460 to reposition the indicator 132 on a new list item and/or step 480 to populate the purchase order panel 120 with the newly selected offer information, as well as update the offer matrix region 110 to move the circle or other marking to the newly selected data point 113*a*. If the user feels that the displayed offers are too limited or too inclusive, the user may apply or remove filters using the filter menu 140, including choosing a different ranking criterion (e.g. lowest price, shortest lead time, etc.) using the ranking criterion selector 148. In response to the user's interaction with the filter menu 140, the electronic component sourcing apparatus 300 may reperform steps 430 and 450 to plot new data points 113 and corresponding list items, as well as possibly reperforming steps 410 and 420 to display new axes 111, 112 to produce a better view of the new set of data points 113.

When the user is finally ready to proceed with a purchase, the user may interact with either the quantity input field 123 and "Add to cart" button 125 of the purchase order panel 120 or the quantity input field 132 and "Add to cart" button 135 of the offer list 130 to proceed with a purchase of an entered quantity from a selected vendor. Depending on the arrangement between the vendor and the service provider of the electronic component sourcing GUI 100 (who may function as a marketplace, for example), the "Add to cart" button may, for example, begin a process of placing an order with the service provider of the electronic component sourcing GUI 100, begin a process of placing an order directly with the vendor, link to an external website of a vendor, etc.

Figure 5:
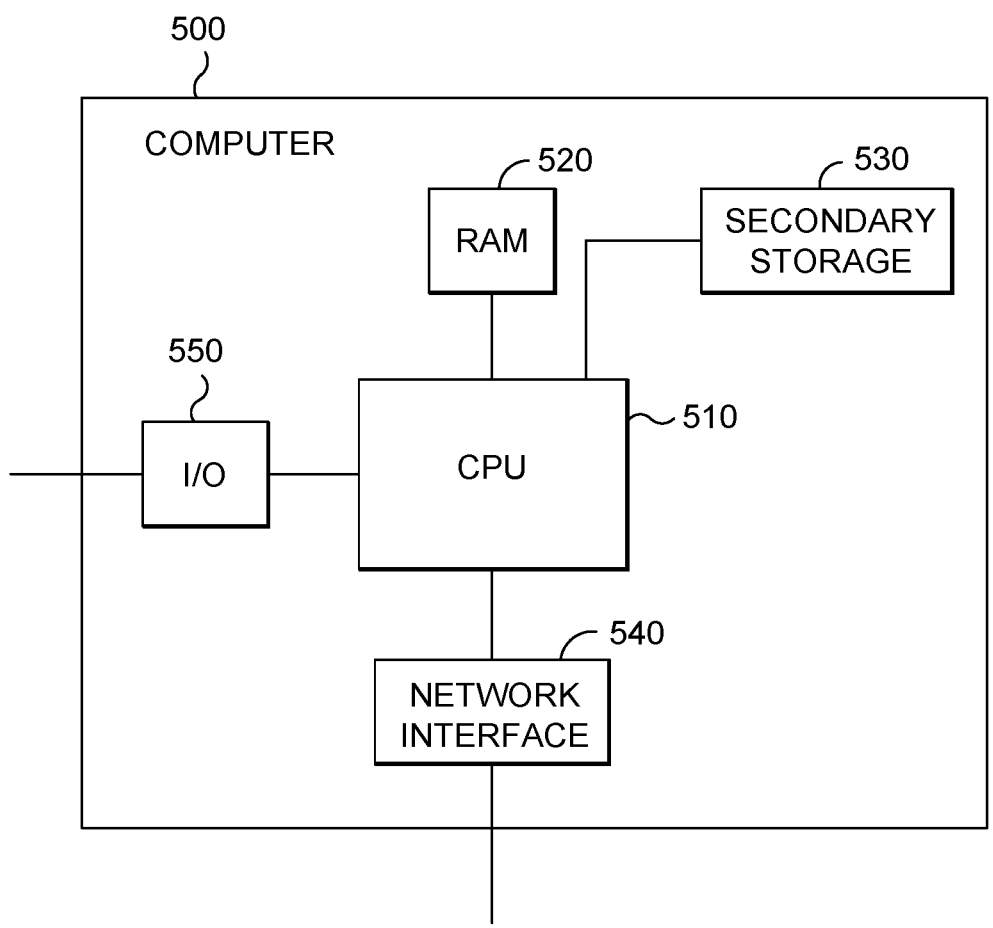
FIG. 5 shows an example of a computer in which the electronic component sourcing apparatus of FIG. 3, the operational flow of FIG. 4, and/or other embodiments of the disclosure may be wholly or partly embodied.

FIG. 5 shows an example of a computer 500 in which the electronic component sourcing apparatus 300 of FIG. 3, the operational flow of FIG. 4, and/or other embodiments of the disclosure may be wholly or partly embodied. As shown in FIG. 5, the computer 500 may include a processor (e.g. a CPU) 510, a system memory (e.g. RAM) 520 that may be connected to the processor 510 by a dedicated memory channel and temporarily stores results of data processing operations performed by the processor 510, and a secondary storage device 530 such as a hard drive. The processor 510 may execute one or more computer programs, which may be tangibly embodied along with an operating system in a computer-readable medium, e.g., the secondary storage device 530. The operating system and the computer programs may be loaded from the secondary storage device 530 into the system memory 520 to be executed by the processor 510. The computer 500 may further include a network interface 540 for network communication (e.g. over the Internet) between the computer 500 and external devices, such as customer devices 400 accessing the electronic component sourcing GUI 100 described throughout this disclosure using a mobile application or web browser. Server-side user interaction with the computer 500 may make use of one or more I/O devices 550, such as a display, mouse, keyboard, etc.

The computer programs may comprise program instructions which, when executed by the processor 510, cause the processor 510 to perform operations in accordance with the various embodiments of the present disclosure. For example, a program that is installed in the computer 500 may cause the computer 500 to function as an apparatus such as the electronic component sourcing apparatus 300 of FIG. 3, e.g., causing the computer 500 to function as some or all of the sections, components, elements, databases, engines, interfaces, modules, updaters, etc. of the apparatus 300 of FIG. 3 (e.g., the user I/O interface 310, the matrix generator 320, etc.). A program that is installed in the computer 500 may also cause the computer 500 to perform an operational flow such as that shown in FIG. 4 or a portion thereof, e.g., causing the computer 500 to perform one or more of the steps of FIG. 4 (e.g., display price axis 410, display lead time axis 420, plot data points 430, etc.).

The above-mentioned program may be provided to the secondary storage 530 by or otherwise reside on an external computer-readable medium such as a DVD-ROM, an optical recording medium such as a CD or Blu-ray Disk, a magneto-optic recording medium such as an MO, a tape medium, a mechanically encoded medium such as a punch card, a semiconductor memory such as an IC card, etc. Other examples of computer-readable media that may store programs in relation to the disclosed embodiments include a hard disk or RAM in a server system connected to a communication network such as a dedicated network or the Internet, with the program being provided to the computer 500 via the network. Such program storage media may, in some embodiments, be non-transitory, thus excluding transitory signals per se, such as radio waves or other electromagnetic waves. Examples of program instructions stored on a computer-readable medium may include, in addition to code executable by a processor, state information for execution by programmable circuitry such as a field-programmable gate arrays (FPGA) or programmable logic array (PLA).

In the above description of the electronic component sourcing GUI 100, electronic component sourcing apparatus 300, and operational flow 400, it is described that an offer matrix of data points 113 may be presented to the user (e.g. returned based on a query to an offer data storage 340) in response to an initial electronic component sourcing request, and that the offer matrix may change to include new data points 113 as the user applies filters, adjusts ranking criteria, etc. It is further contemplated that the offer matrix may also change to include new data points 113 when the user enters a quantity in the quantity input field 123 of the purchase offer panel 120 or the quantity input field 133 of the offer list 130. For example, in a case where the entered quantity surpasses a quantity defined by the price breaks 131, a volume discount may affect the unit price associated with the offers in the offer data storage 340, potentially resulting in a different set of data points 113 responsive to the user's query.

In the example of FIG. 1, the offer list 130 is positioned below the offer matrix region 110 with the purchase order panel 120 positioned to the right-hand side of the offer matrix region 110. However, the electronic component sourcing GUI 100 is not limited to this specific arrangement. For example, the purchase order panel 120 may be positioned to the left-hand side of the offer matrix region 110, above the offer matrix region 110, below the offer matrix region 110, or diagonally with respect to the offer matrix region 110. Likewise, the offer list 310 may be positioned above the offer matrix region 110, to the right-hand side of the offer matrix region 110, to the left-hand side of the offer matrix region 110, or diagonally with respect to the offer matrix region 110.

As described above with respect to FIG. 2, each of the data points 113 may be a different color (or have a different distinguishing characteristic), with the current set of colors etc. displayed in a palette 114, the palette 114 in some cases being adjustable by a user. It is further contemplated that the arrangement of colors in the palette 114 may be a recognizable sequence such as a rainbow sequence or a sequence of increasing or decreasing brightness, saturation, color value, pattern density, etc. The data points 113 may then be color-coded such that the sequence of colors reflects the ranking of the data points 113 according to the selected ranking criterion (e.g. the number one "best offer" red, the next "best offer" orange, etc.).

As described above, the filter menu 140 may allow filtering using a combination of basic filters that act in a binary fashion (i.e. the offer either meets the filter condition or does not) and ranking criteria. In this regard, it is contemplated that any of the basic filters described above may additionally or alternatively serve as ranking criteria and vice versa. For example, a basic filter may be applied to exclude offers with lead times or unit prices above a specified threshold or a ranking criterion may be applied to rank offers by user reviews or by vendor type (e.g. manufacturer direct before franchised distributor).

Throughout the above description of the electronic component sourcing GUI 100, reference is made to various means of user interaction, including clicks, taps, etc. The disclosure is not intended to be limited to such specific interactions and any known user-device interactions may be applicable, including but not limited to keyboard, mouse, touch, gesture, voice, eye-tracking, etc.

The disclosed embodiments, including the GUI 100, apparatus 300, and operational flow 400 are described in relation to electronic component sourcing, where each data point 113 represents a vendor's offer to sell an electronic component. However, the disclosure is not intended to be limited to this particular business scenario. Transactions other than sales (e.g. leases, rentals, service uses, etc.) are contemplated, as are transactions involving products or services other than electronic components, such as mechanical parts, cleaning or maintenance services, etc.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A non-transitory program storage medium on which are stored instructions executable by a processor to perform operations for generating a graphical user interface for electronic component sourcing, the operations comprising:
   displaying a first axis marked in units of price;
   displaying a second axis marked in units of time, the second axis perpendicular to the first axis;
   plotting a plurality of data points with respect to the first axis and the second axis, each of the plurality of data points corresponding to an offer to sell the electronic component and defining an ordered pair having a first value, plotted along the first axis, representative of a unit price of the electronic component and a second value, plotted along the second axis, representative of a lead time associated with purchasing the electronic component;
   displaying a purchase order panel, adjacent to the first and second axes, by which a user of the graphical user interface may initiate a purchase of the electronic component according to a selected offer;
   populating the purchase order panel with the unit price of the electronic component according to the selected offer in response to a user interaction with a corresponding one of the data points;
   displaying an offer list, each item of the offer list corresponding to one of the plurality of data points; and positioning an indicator with respect to one of the items of the offer list in response to a user interaction with a corresponding one of the data points.

2. The non-transitory program storage medium of claim 1 wherein each item of the offer list includes a display of any price breaks associated with the corresponding offer.

3. The non-transitory program storage medium of claim 2 wherein each item of the offer list further includes a purchase order quantity input field and a display of a subtotal that is calculated in response to a quantity entered by a user in the purchase order quantity input field, the calculation of the subtotal taking into account any price breaks associated with the corresponding offer.

4. The non-transitory program storage medium of claim 1 wherein the operations further comprise displaying a filter menu by which a user of the graphical user interface may limit the plurality of data points in accordance with one or more chosen filters.

5. The non-transitory program storage medium of claim 4 wherein the filter menu includes one or more filters selected from the group consisting of full factory packaging, partial factory packaging, manufacturer direct vendor, franchised distributor vendor, stock delivery, lead time delivery, tape and reel packaging, cut tape packaging, tray packaging, tube packaging, ammo packaging, bulk packaging, and manufacturing date code more than two years old.

6. The non-transitory program storage medium of claim 4 wherein the plurality of data points is limited to a predetermined number in accordance with a selected ranking criterion.

7. The non-transitory program storage medium of claim 6 wherein the filter menu allows the user to designate the selected ranking criterion from among one or more ranking criteria.

8. The non-transitory program storage medium of claim 7 wherein the one or more ranking criteria include lowest unit price and shortest lead time.

9. The non-transitory program storage medium of claim 8 wherein the one or more ranking criteria further include a best offer criterion that is a function of unit price and lead time.

10. The non-transitory program storage medium of claim 4 wherein the operations further comprise adjusting the first axis and the second axis to accommodate a change in the plurality of data points in response to a user interaction with the filter menu.

11. A method of generating a graphical user interface for electronic component sourcing, the method comprising:
displaying a first axis marked in units of price;
displaying a second axis marked in units of time, the second axis perpendicular to the first axis;
plotting a plurality of data points with respect to the first axis and the second axis, each of the plurality of data points corresponding to an offer to sell the electronic component and defining an ordered pair having a first value, plotted along the first axis, representative of a unit price of the electronic component and a second value, plotted along the second axis, representative of a lead time associated with purchasing the electronic component;
displaying a purchase order panel, adjacent to the first and second axes, by which a user of the graphical user interface may initiate a purchase of the electronic component according to a selected offer;
populating the purchase order panel with the unit price of the electronic component according to the selected offer in response to a user interaction with a corresponding one of the data points;
displaying an offer list, each item of the offer list corresponding to one of the plurality of data points; and
positioning an indicator with respect to one of the items of the offer list in response to a user interaction with a corresponding one of the data points.

12. A system for generating a graphical user interface for electronic component sourcing, the system comprising:
a server in communication with a user device; and
a program storage medium on which are stored instructions executable by the server to perform operations for generating a graphical user interface for electronic component sourcing, the graphical user interface accessible by the user device via a web browser or mobile application of the user device, the operations including:
displaying a first axis marked in units of price;
displaying a second axis marked in units of time, the second axis perpendicular to the first axis;
plotting a plurality of data points with respect to the first axis and the second axis, each of the plurality of data points corresponding to an offer to sell the electronic component and defining an ordered pair having a first value, plotted along the first axis, representative of a unit price of the electronic component and a second value, plotted along the second axis, representative of a lead time associated with purchasing the electronic component;
displaying a purchase order panel, adjacent to the first and second axes, by which a user of the graphical user interface may initiate a purchase of the electronic component according to a selected offer;
populating the purchase order panel with the unit price of the electronic component according to the selected offer in response to a user interaction with a corresponding one of the data points
displaying an offer list, each item of the offer list corresponding to one of the plurality of data points; and
positioning an indicator with respect to one of the items of the offer list in response to a user interaction with a corresponding one of the data points.

13. A non-transitory program storage medium on which are stored instructions executable by a processor to perform operations for generating a graphical user interface for electronic component sourcing, the operations comprising:
displaying a first axis marked in units of price;
displaying a second axis marked in units of time, the second axis perpendicular to the first axis;
plotting a plurality of data points with respect to the first axis and the second axis, each of the plurality of data points corresponding to an offer to sell the electronic component and defining an ordered pair having a first value, plotted along the first axis, representative of a unit price of the electronic component and a second value, plotted along the second axis, representative of a lead time associated with purchasing the electronic component;
displaying a purchase order panel, adjacent to the first and second axes, by which a user of the graphical user interface may initiate a purchase of the electronic component according to a selected offer;
populating the purchase order panel with the unit price of the electronic component according to the selected offer in response to a user interaction with a corresponding one of the data points; and displaying an offer list, each item of the offer list corresponding to one of the plurality of data points;
wherein each item of the offer list includes a display of any price breaks associated with the corresponding offer;
wherein each item of the offer list includes a purchase order quantity input field and a display of a subtotal that is calculated in response to a quantity entered by a user in the purchase order quantity input field, the calculation of the subtotal taking into account any price breaks associated with the corresponding offer;
wherein each item of the offer list includes a display of a minimum order quantity and a minimum packaging quantity associated with the corresponding offer, and the purchase order quantity input field prevents entry of a quantity that violates the minimum order quantity or the minimum packaging quantity.

14. The non-transitory program storage medium of claim 13 wherein the purchase order panel includes the purchase order quantity input field and the display of the subtotal that is calculated in response to the quantity entered by the user in the purchase order quantity input field, the calculation of the subtotal taking into account any price breaks associated with the selected offer.

15. A system for generating a graphical user interface for electronic component sourcing, the system comprising:
   a server in communication with a user device; and
   a program storage medium on which are stored instructions executable by the server to perform operations for generating a graphical user interface for electronic component sourcing, the graphical user interface accessible by the user device via a web browser or mobile application of the user device, the operations including:
      displaying a first axis marked in units of price;
      displaying a second axis marked in units of time, the second axis perpendicular to the first axis;
      plotting a plurality of data points with respect to the first axis and the second axis, each of the plurality of data points corresponding to an offer to sell the electronic component and defining an ordered pair having a first value, plotted along the first axis, representative of a unit price of the electronic component and a second value, plotted along the second axis, representative of a lead time associated with purchasing the electronic component;
      displaying a purchase order panel, adjacent to the first and second axes, by which a user of the graphical user interface may initiate a purchase of the electronic component according to a selected offer;
      populating the purchase order panel with the unit price of the electronic component according to the selected offer in response to a user interaction with a corresponding one of the data points; and
      displaying an offer list, each item of the offer list includes a purchase order quantity input field and corresponds to one of the plurality of data points;
      wherein each item of the offer list includes a display of a minimum order quantity and a minimum packaging quantity associated with the corresponding offer, and the purchase order quantity input field prevents entry of a quantity that violates the minimum order quantity or the minimum packaging quantity.

16. A method of generating a graphical user interface for electronic component sourcing, the method comprising:
   displaying a first axis marked in units of price;
   displaying a second axis marked in units of time, the second axis perpendicular to the first axis;
   plotting a plurality of data points with respect to the first axis and the second axis, each of the plurality of data points corresponding to an offer to sell the electronic component and defining an ordered pair having a first value, plotted along the first axis, representative of a unit price of the electronic component and a second value, plotted along the second axis, representative of a lead time associated with purchasing the electronic component;
   displaying a purchase order panel, adjacent to the first and second axes, by which a user of the graphical user interface may initiate a purchase of the electronic component according to a selected offer;
   populating the purchase order panel with the unit price of the electronic component according to the selected offer in response to a user interaction with a corresponding one of the data points;
   displaying an offer list, each item of the offer list includes a purchase order quantity input field and corresponds to one of the plurality of data points;
   wherein each item of the offer list includes a display of a minimum order quantity and a minimum packaging quantity associated with the corresponding offer, and the purchase order quantity input field prevents entry of a quantity that violates the minimum order quantity or the minimum packaging quantity.

17. A non-transitory program storage medium medium on which are stored instructions executable by a processor to perform operations for generating a graphical user interface for electronic component sourcing, the operations comprising:
   displaying a first axis marked in units of price;
   displaying a second axis marked in units of time, the second axis perpendicular to the first axis;
   plotting a plurality of data points with respect to the first axis and the second axis, each of the plurality of data points corresponding to an offer to sell the electronic component and defining an ordered pair having a first value, plotted along the first axis, representative of a unit price of the electronic component and a second value, plotted along the second axis, representative of a lead time associated with purchasing the electronic component;
   displaying a purchase order panel, adjacent to the first and second axes, by which a user of the graphical user interface may initiate a purchase of the electronic component according to a selected offer; and
   populating the purchase order panel with the unit price of the electronic component according to the selected offer in response to a user interaction with a corresponding one of the data points;
   wherein each of the plurality of data points is a different color, and the purchase order panel includes an element whose color changes to match the color of the data point corresponding to the selected offer.

18. A system for generating a graphical user interface for electronic component sourcing, the system comprising:
   a server in communication with a user device; and
   a program storage medium on which are stored instructions executable by the server to perform operations for generating a graphical user interface for electronic component sourcing, the graphical user interface accessible by the user device via a web browser or mobile application of the user device, the operations including:
      displaying a first axis marked in units of price;
      displaying a second axis marked in units of time, the second axis perpendicular to the first axis;

plotting a plurality of data points with respect to the first axis and the second axis, each of the plurality of data points corresponding to an offer to sell the electronic component and defining an ordered pair having a first value, plotted along the first axis, representative of a unit price of the electronic component and a second value, plotted along the second axis, representative of a lead time associated with purchasing the electronic component;

displaying a purchase order panel, adjacent to the first and second axes, by which a user of the graphical user interface may initiate a purchase of the electronic component according to a selected offer;

populating the purchase order panel with the unit price of the electronic component according to the selected offer in response to a user interaction with a corresponding one of the data points;

wherein each of the plurality of data points is a different color, and the purchase order panel includes an element whose color changes to match the color of the data point corresponding to the selected offer.

19. A method of generating a graphical user interface for electronic component sourcing, the method comprising:

displaying a first axis marked in units of price;

displaying a second axis marked in units of time, the second axis perpendicular to the first axis;

plotting a plurality of data points with respect to the first axis and the second axis, each of the plurality of data points corresponding to an offer to sell the electronic component and defining an ordered pair having a first value, plotted along the first axis, representative of a unit price of the electronic component and a second value, plotted along the second axis, representative of a lead time associated with purchasing the electronic component;

displaying a purchase order panel, adjacent to the first and second axes, by which a user of the graphical user interface may initiate a purchase of the electronic component according to a selected offer;

populating the purchase order panel with the unit price of the electronic component according to the selected offer in response to a user interaction with a corresponding one of the data points;

wherein each of the plurality of data points is a different color, and the purchase order panel includes an element whose color changes to match the color of the data point corresponding to the selected offer.

20. A system for generating a graphical user interface for electronic component sourcing, the system comprising:

a server in communication with a user device; and a program storage medium on which are stored instructions executable by the server to perform operations for generating a graphical user interface for electronic component sourcing, the graphical user interface accessible by the user device via a web browser or mobile application of the user device, the operations including:

displaying a first axis marked in units of price;

displaying a second axis marked in units of time, the second axis perpendicular to the first axis;

plotting a plurality of data points with respect to the first axis and the second axis, each of the plurality of data points corresponding to an offer to sell the electronic component and defining an ordered pair having a first value, plotted along the first axis, representative of a unit price of the electronic component and a second value, plotted along the second axis, representative of a lead time associated with purchasing the electronic component;

displaying a purchase order panel, adjacent to the first and second axes, by which a user of the graphical user interface may initiate a purchase of the electronic component according to a selected offer;

populating the purchase order panel with the unit price of the electronic component according to the selected offer in response to a user interaction with a corresponding one of the data point;

wherein the purchase order panel includes a display of a minimum order quantity and a minimum packaging quantity associated with the selected offer, and a purchase order quantity input field of the selected offer prevents entry of a quantity that violates the minimum order quantity or the minimum packaging quantity.

21. A method of generating a graphical user interface for electronic component sourcing, the method comprising:

displaying a first axis marked in units of price;

displaying a second axis marked in units of time, the second axis perpendicular to the first axis;

plotting a plurality of data points with respect to the first axis and the second axis, each of the plurality of data points corresponding to an offer to sell the electronic component and defining an ordered pair having a first value, plotted along the first axis, representative of a unit price of the electronic component and a second value, plotted along the second axis, representative of a lead time associated with purchasing the electronic component;

displaying a purchase order panel, adjacent to the first and second axes, by which a user of the graphical user interface may initiate a purchase of the electronic component according to a selected offer;

populating the purchase order panel with the unit price of the electronic component according to the selected offer in response to a user interaction with a corresponding one of the data points;

wherein the purchase order panel further includes a display of a minimum order quantity and a minimum packaging quantity associated with the selected offer, and a purchase order quantity input field of the selected offer prevents entry of a quantity that violates the minimum order quantity or the minimum packaging quantity.

* * * * *